(12) United States Patent
DeCusatis et al.

(10) Patent No.: US 10,116,622 B2
(45) Date of Patent: *Oct. 30, 2018

(54) SECURE COMMUNICATION CHANNEL USING A BLADE SERVER

(71) Applicant: International Business Machines Corporation, Armonk, NY (US)

(72) Inventors: Casimer M. DeCusatis, Poughkeepsie, NY (US); Vincenzo V. Di Luoffo, Sandy Hook, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/574,120

(22) Filed: Dec. 17, 2014

(65) Prior Publication Data

US 2016/0057109 A1 Feb. 25, 2016

Related U.S. Application Data

(63) Continuation of application No. 14/462,726, filed on Aug. 19, 2014.

(51) Int. Cl.
 *H04L 29/06* (2006.01)
(52) U.S. Cl.
 CPC ...... *H04L 63/0209* (2013.01); *H04L 63/0281* (2013.01); *H04L 63/0485* (2013.01); *H04L 63/20* (2013.01); *H04L 63/205* (2013.01); *H04L 63/08* (2013.01)

(58) Field of Classification Search
 CPC ............................... H04L 63/08; H04L 63/20
 See application file for complete search history.

(56) References Cited

U.S. PATENT DOCUMENTS

| | | | |
|---|---|---|---|
| 6,671,809 B1 * | 12/2003 | Perona | ................. G06F 21/121 713/1 |
| 7,315,985 B1 | 1/2008 | Gauvin et al. | |
| 7,836,497 B2 | 11/2010 | Hossain et al. | |
| 8,279,874 B1 * | 10/2012 | Lu | ....................... H04L 41/0806 370/395.2 |
| 8,291,378 B2 | 10/2012 | Arnold et al. | |
| 8,661,434 B1 | 2/2014 | Liang et al. | |

(Continued)

OTHER PUBLICATIONS

Debashis Basak et al., Virtualizing Networking and Security in the Cloud, Dec. 2010, ACM, vol. 44 Issue 4, pp. 86-94.*

(Continued)

*Primary Examiner* — Kari L Schmidt
*Assistant Examiner* — Fahimeh Mohammadi
(74) *Attorney, Agent, or Firm* — Toler Law Group, PC

(57) ABSTRACT

Systems and methods to manage a network include a security blade server configured to perform a security operation on network traffic, and a controller configured to virtualize a plurality of network devices. The controller is further configured to program the network traffic to flow through the security blade server to create a secure network channel. A software defined environment may includes an application program interface (API) used to program the flow of the network traffic. The controller may use the API to virtually and selectively position the security blade server as waypoint for the network traffic.

20 Claims, 4 Drawing Sheets

(56) References Cited

U.S. PATENT DOCUMENTS

| | | | |
|---|---|---|---|
| 8,813,174 B1* | 8/2014 | Koeten | H04L 67/10 709/223 |
| 2004/0215811 A1* | 10/2004 | Bar | H04L 67/322 709/232 |
| 2005/0091396 A1 | 4/2005 | Nilakantan et al. | |
| 2006/0089922 A1* | 4/2006 | Flores | G06F 9/5005 705/500 |
| 2006/0236093 A1* | 10/2006 | Brok | H04L 63/0209 713/151 |
| 2007/0004393 A1 | 1/2007 | Forsberg et al. | |
| 2007/0083723 A1 | 4/2007 | Dey et al. | |
| 2007/0204338 A1 | 8/2007 | Aiello et al. | |
| 2009/0228868 A1 | 9/2009 | Drukman | |
| 2010/0024001 A1 | 1/2010 | Campbell et al. | |
| 2010/0074141 A1 | 3/2010 | Nguyen | |
| 2010/0103837 A1* | 4/2010 | Jungck | H04L 29/12066 370/252 |
| 2010/0281528 A1 | 11/2010 | Hayton et al. | |
| 2010/0293250 A1* | 11/2010 | Ankaiah | H04L 12/56 709/219 |
| 2011/0099258 A1* | 4/2011 | Ayachitula | G06F 11/3006 709/223 |
| 2011/0277029 A1 | 11/2011 | Natarajan et al. | |
| 2012/0093035 A1* | 4/2012 | Kidambi | H04L 49/3054 370/255 |
| 2012/0291024 A1* | 11/2012 | Barabash | H04L 49/356 718/1 |
| 2013/0034109 A1 | 2/2013 | Cardona et al. | |
| 2013/0238885 A1* | 9/2013 | Tripathi | G06F 9/4416 713/2 |
| 2013/0281077 A1 | 10/2013 | Zou et al. | |
| 2013/0322446 A1* | 12/2013 | Biswas | H04L 12/4633 370/392 |
| 2014/0059247 A1 | 2/2014 | Vachharajani et al. | |
| 2014/0112189 A1 | 4/2014 | Abraham et al. | |
| 2014/0157422 A1 | 6/2014 | Livshits et al. | |
| 2014/0245423 A1 | 8/2014 | Lee | |
| 2015/0033222 A1 | 1/2015 | Hussain et al. | |
| 2015/0163152 A1 | 6/2015 | Li | |
| 2015/0244583 A1* | 8/2015 | Wan | H04L 41/145 709/223 |
| 2015/0249673 A1 | 9/2015 | Niemoeller et al. | |
| 2016/0057206 A1 | 2/2016 | Decusatis et al. | |

OTHER PUBLICATIONS

Yukihiro Nakagawa et al., A Management Method of IP Multicast in Overlay Networks using OpenFlow, Aug. 13, 2012, ACM, pp. 91-96.*

Aled Edwards et al., Diverter: A New Approach to Networking Within Virtualized Infrastructures, Aug. 21, 2009, ACM, pp. 103-110.*

Carolyn J. Sher DeCusatis et al., Communication within Clouds: Open Standards and Proprietary Protocols for Data Center Networking, Sep. 2012, IEEE, pp. 26-33.*

"Enterprise Manager Cloud Administration Guide: 6 Defining and Managing Cloud Policies", Oracle, http://docs.oracle.com/cd/E24628_01/doc.121/e28814/cloud_policies.htm#EMCLO298, 20 pages.

"List of IBM Patents or Patent Applications Treated as Related", Dec. 16, 2014, 2 pages.

Liyanage, et al., "Securing the control channel of software-defined mobile networks," Jun. 19, 2014, Proceeding of IEEE International Symposium on a World of Wireless, Mobile and Multimedia Networks 2014, V-19.

Gronosky, M. "Understanding the Vulnerabilities of a SOA Platform," 2010 Ninth IEEE International Sypmposium on Network Computing and Applications, Jul. 15-17, 2010, IEEE, pp. 182-187.

Karjoth, G., "Access Control with IBM Tivoli Access Manager," May 2003, ACM Transactions on Information and System Security, vol. 6, No. 2, pp. 232-257.

Angaye, C., "Security in a Networked Environment," Summer 1995, ACM, vol. 3, Iss. 1, pp. 2-5.

Xu, K, et al., "Profiling-as-a-Service in Multi-Tenant Cloud Computing Environments," 32nd International Conference on Distributed Computing Systems Workshops, IEEE, Jun. 2012, pp. 461-465.

* cited by examiner

SECURE COMMUNICATION CHANNEL USING A BLADE SERVER

I. CROSS REFERENCE TO RELATED APPLICATIONS

This application is a continuation application and claims priority from U.S. patent application Ser. No. 14/462,726, entitled "SECURE COMMUNICATION CHANNEL USING A BLADE SERVER," filed on Aug. 19, 2014, which is incorporated herein in its entirety.

II. FIELD OF THE DISCLOSURE

The present disclosure relates generally to computer networking architectures, and in particular, to a system and a method managing for devices and communication flow in network.

III. BACKGROUND

Sensitive data may become vulnerable to breach when transferred over a network. Security protocols to protect the sensitive data often come with large processing demands. For example, Internet Protocol Security (IPsec) protocol and related security functions are workload intensive functions that can negatively affect network performance. More particularly, processing can slow network communications and draw resources away from other work. Moreover, the hardware used to implement security protocols can require numerous routing cables and physical connections that can complicate maintenance and hardware updates.

IV. SUMMARY OF THE DISCLOSURE

In a particular embodiment, an apparatus includes a security blade server configured to perform a security operation on network traffic, and a controller configured to virtualize a plurality of network devices. The plurality of network devices includes the security blade server, and the controller is further configured to program the network traffic to flow through the security blade server to create a secure network channel.

The apparatus may further include a software defined environment that includes an application program interface (API) used to program the flow of the network traffic. A memory accessible to the controller may include the API. The controller may use the API to virtually and selectively position the security blade server as waypoint for the network traffic.

The security operation may include at least one of a trusted computing metric, an IPsec protocol, a validation operation, and a cryptographic protocol. The security blade server may be dedicated to performing the security operation. A Distributed Overlay Virtual Ethernet (DOVE) network that includes a set of virtual local area networks (VLANs). A central secure server may be configured to virtually position the secure network channel between the plurality of network devices without reconfiguring at least one of a router and switch. An application profile may be executable by the controller to concurrently program the security operation with a plurality of subscribing security blade servers that includes the security blade server. A first portion of a network may be bridged together by the security blade server to separate a second portion of the network.

According to another particular embodiment, an apparatus includes a memory having program code to perform a security operation, and a controller configured to access the memory to execute the program code to perform the security operation on network traffic flowing between a plurality of virtualized network devices. An API may be used to configure the controller to receive the network traffic.

An application profile may be executable by the controller to concurrently program the security operation with a plurality of subscribing security blade servers that includes the security blade server. A central secure server may be configured to provide the secure network channel between a plurality of nodes without reconfiguring at least one of a router and switch.

According to another particular embodiment, a method of managing a network includes virtualizing a plurality of network devices and configuring a security blade server to receive network traffic flowing between the plurality of network devices. The security blade server may perform a security operation on the network traffic.

An address list of subscribed network devices associated with the security operation may be maintained. A data packet may be encapsulated with an address associated with the security blade server. A central secure server may virtually position the secure network channel between the plurality of network devices without reconfiguring a router or a switch. A single API may be used to concurrently configure the security blade server and another security blade server. The security operation may include at least one of a trusted computing metric, an IPsec protocol, a validation operation, and a cryptographic protocol. As discussed herein, a first portion of a network may be bridged together to separate a second portion of the network.

An embodiment of a security blade server may perform security operations on a local processor to relieve a processing burden from other network components. Virtual data flow routing (i.e., using software) in an SDE offers advantages over having to physically connect devices by plugging and routing cables. Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. BRIEF DESCRIPTION OF THE DRAWINGS

VI. DETAILED DESCRIPTION

Figure 1:
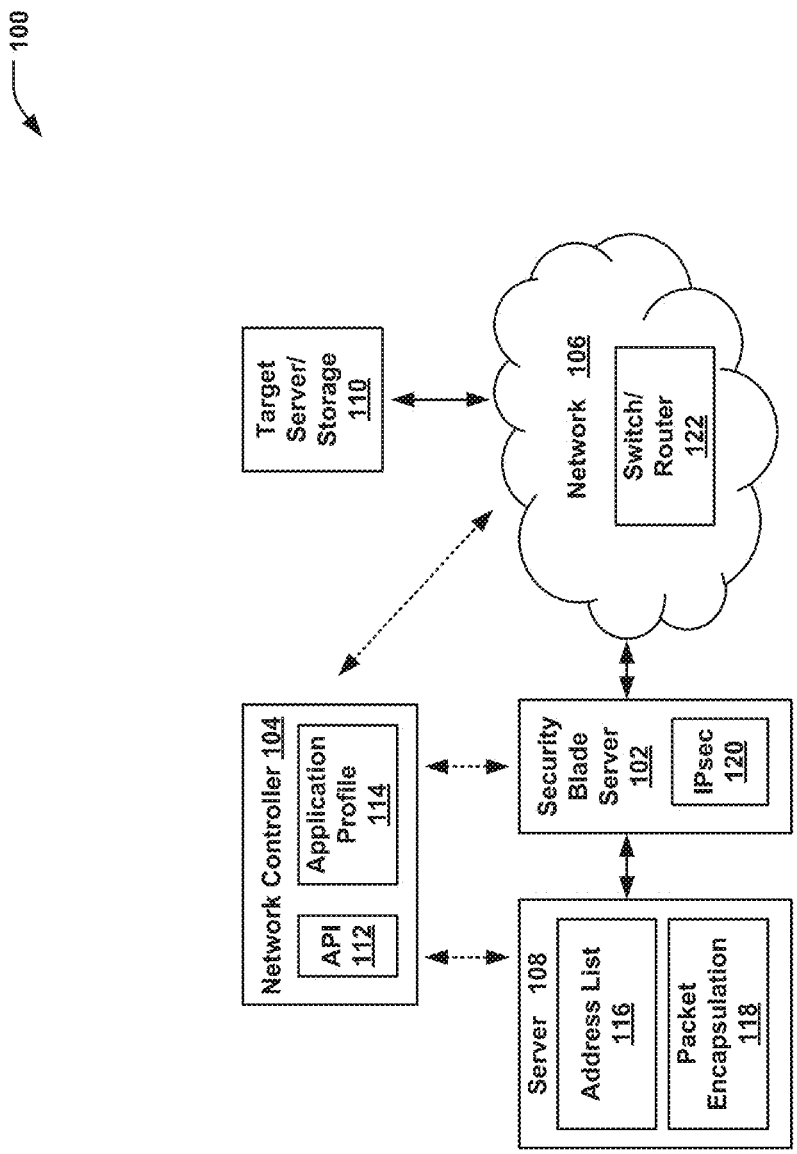
FIG. 1 is a block diagram of a computing system configured to provide secure communication channels using a dedicated security blade server configured to perform security operations on network traffic.

An embodiment of a system provides secure communication channels in the network of a software defined environment (SDE) using a dedicated, security blade server. Network traffic may be directed to flow through the security blade server. Internet Protocol Security (IPsec) and other security operations executed at the security blade server may automatically and dynamically program security attributes and create a secure network communication channel within the SDE.

The SDE may include an application program interface (API) to virtually position a security blade server as waypoint for network traffic. IPsec and related security functions are workload (e.g., processor and memory resource) intensive functions that could slow and otherwise negatively affect switch performance. The security blade server may run the functions on a local processor to relieve the processing burden from other network components. The virtualization of the network may allow the security blade server to function as a waypoint to selected data traffic without a proportionate amount of physical cabling.

An embodiment of the system includes data center network overlays that provide security attributes. A Distributed Overlay Virtual Ethernet (DOVE) network may include a set of virtual local area networks (VLANs) to virtualize a physical network topology. Secure communication channels may be provided to protect data and the SDE from threats.

The security blade server may handle security for the SDE, such as in a Blade Server Environment, as pioneered by IBM. The security blade server, or information technology element (ITE), may be specifically designed to perform a security operation. Plugging the security blade server into the blade server environment may initiate the implementation of trusted computing metrics. Trusted computing metrics may include implementing an IPsec protocol suite and cryptographic functions, such as key protection.

IPsec may secure Internet Protocol (IP) communications by authenticating and encrypting each IP packet of a communication session. IPsec may include protocols for establishing mutual authentication between agents at the beginning of the session and negotiation of cryptographic keys to be used during the session. IPsec may be used to protect data flows between a pair of hosts (host-to-host), between a pair of security gateways (network-to-network), or between a security gateway and a host (network-to-host).

An SDE may include a data center where server networking and storage functionality is programmable. An SDE may include, for example, separate storage areas with common management to program the attributes of the storage. The SDE facilitates the initiation of application programming interfaces (APIs) that enable control over all of the network and storage components.

An SDE may be implemented in a blade server system to enable cloud middleware, such as OpenStack and network controllers for Software-Defined Networking (SDN). An embodiment of an SDE may include a plugin mechanism enabling OpenStack to receive security features using a dedicated blade server, or Information Technology Element (ITE). Alternately, this function may be implemented by a virtualized security appliance as a waypoint on a data center network overlay. In either case, the security blade server may implement trusted computing metrics and functions. A waypoint may include a virtual position along a traffic flow in a network where there previously was not a virtual device or routed flow to a physical device.

IPSec (e.g., trusted computing and login validation) may be performed at a security blade server compute node, rather than in a network switch. The security blade server may be included in virtualized layer-2 and layer-3 network devices. For example, the security blade server may be included in a DOVE network that uses VLANs. DOVE is a tunneling and virtualization technology for computer networks, created and backed by IBM. DOVE allows the creation of network virtualization layers for deploying, controlling, and managing multiple independent and isolated network applications over a shared physical network infrastructure. The security blade server may encrypt relevant data at an entry point of a data network. A DOVE gateway may bridge the portion of the network secured by the security blade server from the rest of the network. An equivalent of a virtual Domain Name System (DNS) service may be established to accommodate the IPSec.

The DOVE overlay may provide an abstraction of the layer-2 and layer-3 properties of the network using software running on a host server and over Internet Protocol (IP) network hardware. The DOVE controller may communicate with switches in the network to route traffic and virtualize the IP and media access control address (MAC) address for devices connected to the network, such as the security blade server.

As a part of the security operation, keys may be stored and accessed to handle secure processing. The security blade server may virtualize IPSec, as well as protect the keys and other cryptographic operations in a physical, protected enclosure.

According to a particular embodiment, a virtualized security appliance may be hosted as a virtual network overlay on one more security blade servers. For example, a distributed IPsec gateway may be deployed on IT equipment to encrypt and encapsulate data originating from nodes connected to the virtual server. The security blade server may be configurable based on attributes of an SDE. A central secure server may provide secure communication channels between nodes without reconfiguring a router or switch.

An embodiment of the system deploys IPsec and other trusted computing networks across data center networks to provide security functions. For example, a trusted computing metric may validate individuals during login using the security blade server. This feature may improve efficiency versus having to deploy one or more separate interfaces into the network switches.

Traffic flow may be created or otherwise directed to pass through the security blade server in the SDE. For example, the DOVE network may be used to create a traffic flow. In this manner, the SDE may virtualize networking functions, and DOVE algorithms may control traffic flow through the security blade server to implement secure communication channels.

Portions of the network that are secured by the security blade server may be bridged together. The bridged portions may further be separated, or walled off, from other portions that are not secured. In this manner, an embodiment functions similar to a DNS, in that different virtual machines may be mapped into different virtual networks. The DOVE protocol may construct an abstraction of a network to virtualize layer-2 and layer-3 addresses. The security blade server may be selectively inserted at any position on the virtual network. Virtual data flow routing (i.e., using software) in an SDE offers advantages over having to physically connect devices by plugging and routing cables.

The SDE may provide numerous virtual network flows over physical network infrastructure devices. Software executing in the SDE allows the virtual data flows to be created through different devices without having to physically configure the hardware, network devices. For instance, data flows may be directed towards the security blade server having the IPSec and other security functions.

Multiple security blade servers may be concurrently and dynamically programmed by an application profile. The application profile may include attributes used to program operational functions of the security blade servers via an API of the SDE to support an application in a secure manner. An embodiment of a system to manage a network includes a single interface configured to concurrently program multiple network devices. For example, a programmer may interact and configure multiple switches and routers at once. Application profiles are written that allow end-to-end programming across switches, routers, storage, as well as the security blade servers. An imported application profile may coordinate the concurrent programming attributes of the security blade servers and other network devices. An application profile enables an SDE to dynamically share attributes with different, subscribing security blade servers and other network devices to support an application in a secure manner.

Turning more particularly to the drawings, FIG. 1 illustrates a system 100 that includes a security blade server 102 dedicated to perform a security operation on network traffic. The system 100 further may include a network controller 104, or secure network server, configured to virtualize a plurality of network devices. The plurality of network devices may include the security blade server 102, a network 106, a server 108, and a target device 110 (e.g., a server or storage). The network controller 104 may further be configured to program the network traffic to flow through the security blade server 102 to create a secure network channel.

The system 100 may further include a software defined environment that has an API 112 used to program the flow of the network traffic. The API 112 of FIG. 1 is shown as being located in the network controller 104, however, one skilled in the art will appreciated that the API 112, along with other modules of the system 100, such as an application profile 114 and an address list 116, may be located at other devices, such as the server 108 or at the security blade server 102. The network controller 104 may use the API 114 to virtually and selectively position the security blade server 102 as waypoint for the network traffic.

In one example, network traffic may be encapsulated 118 at the server 108 prior to delivery to the target device 110. The network traffic may be routed through the security blade server 102. The security blade server 102 may perform a security operation on the network traffic. For instance, the security blade server 102 may execute IPsec 120 or another security operation, not limited to a trusted computing metric, a validation operation, and a cryptographic protocol. IPsec 120 may be used to protect data flows between a pair of hosts (host-to-host), between a pair of security gateways (network-to-network), or between a security gateway and a host (network-to-host).

According to a particular embodiment, the server 108 may comprise part of a DOVE network that includes a set of virtual local area networks (VLANs). DOVE controller and directory service (e.g., software running in a virtual machine or on a separate server) may be aware of network topology. The DOVE network may further encapsulate packets leaving the server 108 with a header to force traffic to follow a prescribed path through the system 100. As discussed herein, the path may include layer-2 and layer-3 routing through IP networks to the target device 110. The security blade server 102 may comprise hardware that plugs into the server 108. The security blade server 102 and/or the server 108 may have its own IP addressing. The DOVE network may be aware of the security blade server 102 as part of the topology and may create traffic flows through the security blade server 102.

The DOVE gateway may bridge the portion of the network secured by the security blade server from the rest of the network. The address list 116 may function as an equivalent of a virtual DNS service to accommodate the IPSec 120. The DOVE overlay may provide an abstraction of the layer-2 and layer-3 properties of the network 106 using software running on the server 108 and over IP network hardware. One or more of the servers 106, 108 may communicate with switches 122 in the network 106 to route traffic and virtualize the IP and media access MAC addresses for devices connected to the network 106, including the security blade server 102.

The network controller 104 may be configured to virtually position the secure network channel between the plurality of network devices without reconfiguring a router or a switch 122. Performing the security operations at the security blade server 102 may relieve a processing burden from other network components, such as the router or switch 122. The application profile 114 may be executable to concurrently program the security operation with a plurality of subscribing security blade servers that includes the security blade server 102. In a particular embodiment, the security blade server 102 may be dedicated to performing the security operation. However, the security blade server 102 of another embodiment may perform additional, non-security related functions.

Figure 2:
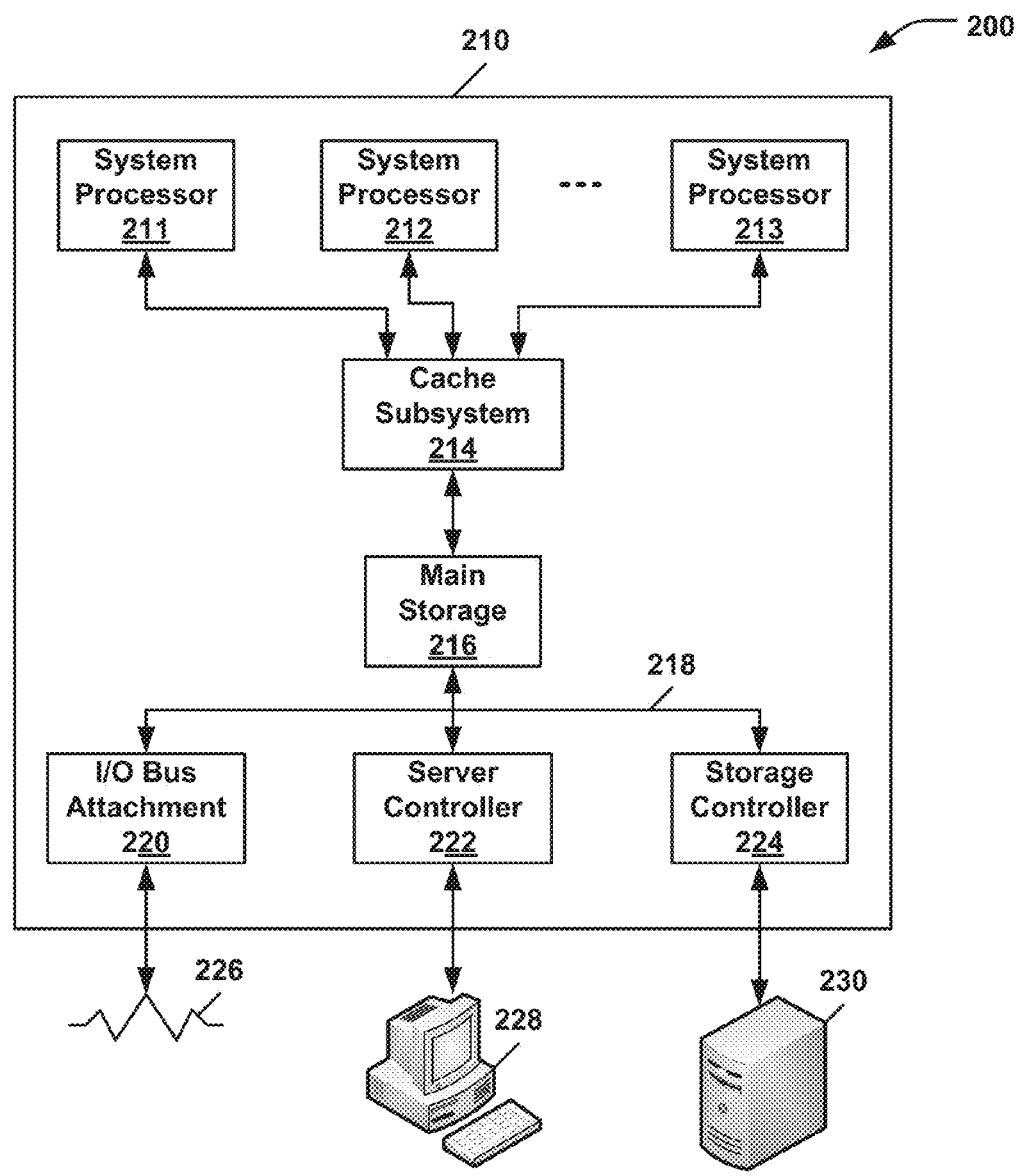
FIG. 2 is a block diagram of a computing system configured to manage network security operations in a manner that is consistent with an embodiment.

FIG. 2 generally illustrates a data processing apparatus 200 configured to provide secure communication channels between network devices. The apparatus 200, in specific embodiments, may include a computer network (e.g., a cloud computing environment or SDE), a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc. The apparatus 200 may be referred to as a logically partitioned computing system or computing system, but may be referred to as computer for the sake of brevity. One suitable implementation of the computer 210 may be a multi-user computer, such as a computer available from International Business Machines Corporation (IBM).

The computer 210 generally includes one or more physical processors 211, 212, 213 coupled to a memory subsystem including a main storage 216. The main storage 216 may include one or more dual in-line memory modules (DIMMs). The DIMM may include an array of dynamic random-access memory (DRAM). Another or the same embodiment may a main storage having a static random access memory (SRAM), a flash memory, a hard disk drive, and/or another digital storage medium. The processors 211, 212, 213 may be multithreaded and/or may have multiple cores. A cache subsystem 214 is illustrated as interposed between the processors 211, 212, 213 and the main storage 216. The cache subsystem 214 typically includes one or more levels of data, instruction and/or combination caches, with certain caches either serving individual processors or multiple processors.

The main storage 216 may be coupled to a number of external input/output (I/O) devices via a system bus 218 and a plurality of interface devices, e.g., an I/O bus attachment interface 220, a server controller 222, and/or a storage controller 224 that respectively provide external access to one or more external networks 226, one or more workstations 228, and/or one or more storage devices such as a direct access storage device (DASD) 230. The system bus 218 may also be coupled to a user input (not shown) operable by a user of the computer 210 to enter data (i.e., the user input sources may include a mouse, a keyboard, etc.)

and a display (not shown) operable to display data from the computer 210 (i.e., the display may be a CRT monitor, an LCD display panel, etc.). The computer 210 may also be configured as a member of a distributed computing environment and communicate with other members of that distributed computing environment through a network 226.

Figure 3:
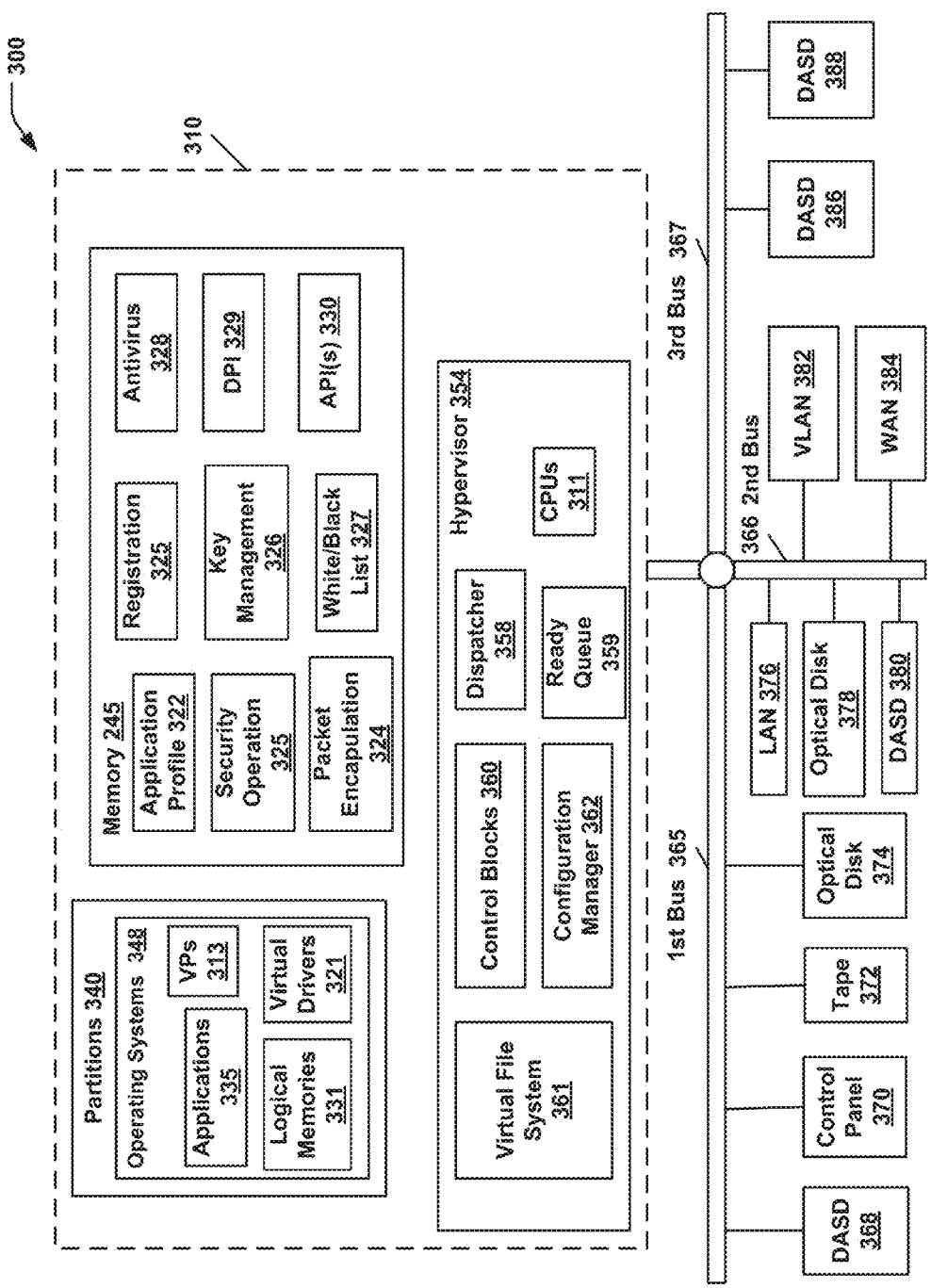
FIG. 3 is a block diagram of the primary software components and resources of a computing system of FIGS. 1-3.

FIG. 3 illustrates in greater detail the primary software components and resources used to configure and manage network devices in a cloud computing environment consistent with a particular embodiment. FIG. 3 generally shows a computing system 300 having a centralized computer 310 characterized as a virtual machine design, as developed by IBM. The computer 310 includes a plurality of partitions that share common processing resources. The logically partitioned computing system architecture may use a single computing machine having one or more processors 311, or central processing units (CPU), coupled with a system memory 245. The processors 311 may execute software configured to simulate one or more virtual processors (VPs) in one or more logical partitions 340.

The logical partitions 340 may each include a portion of the processors 311, the memory 245, and/or other resources of the computer 310. Each partition 340 typically hosts a respective operating environment, or operating system 348. After being configured with resources and the operating systems 348, each logical partition 340 generally operates as if it were a separate computer.

Virtual drivers 321 may interface with physical and virtual hardware to facilitate configuring network devices. For instance, the virtual drivers 321 may include network drivers, storage drivers and compute drivers to interface with server resources. One or more APIs 330 may be used in conjunction with the virtual drivers 321 to automatically configure multiple network devices.

The memory 245 may include an application profile 322 that includes program code to automatically configure multiple network devices of an SDE. The configuration may align with system requirements. As such, illustrative configurable attributes of the application profile 322 may include packet encapsulation 324, a security operation programming for security blade servers, key management information 326, white list/black list information 327, antivirus programming 328, and deep packet inspection (DPI) 329, among other attributes corresponding to system configuration requirements.

The application profile 322 may be one of multiple application profiles that a user downloads to facilitate automatic configuration. As such, a user may retrieve an alternative application profile and may modify another application profile to customize attributes for a specific network application.

An underlying program, called a partition manager, a virtualization manager, or more commonly, a hypervisor 354, may be operable to assign and adjust resources to each partition 340. For instance, the hypervisor 354 may intercept requests for resources from the operating systems 348 or applications configured thereon in order to globally share and allocate the resources of computer 310. For example, when the partitions 340 within the computer 310 are sharing the processors 311, the hypervisor 354 may allocate physical processor cycles between the virtual processors 313 of the partitions 340 sharing the processors 311. The hypervisor 354 may also share other resources of the computer 310. Other resources of the computer 310 that may be shared include the memory 245, other components of the computer 310, other devices connected to the computer 310, and other devices in communication with computer 310. Although not shown, one having ordinary skill in the art will appreciate that the hypervisor 354 may include its own firmware and compatibility table. For purposes of this specification, a logical partition may use either or both the firmware of the partition 340, and hypervisor 354.

The hypervisor 354 may create, add, or adjust physical resources utilized by logical partitions 340 by adding or removing virtual resources from one or more of the logical partitions 340. For example, the hypervisor 354 controls the visibility of the physical processors 311 to each partition 340, aligning the visibility of the one or more virtual processors 313 to act as customized processors (i.e., the one or more virtual processors 313 may be configured with a different amount of resources than the physical processors 311. Similarly, the hypervisor 354 may create, add, or adjust other virtual resources that align the visibility of other physical resources of computer 310.

Each operating system 348 controls the primary operations of its respective logical partition 340 in a manner similar to the operating system of a non-partitioned computer. For example, each logical partition 340 may be a member of the same, or a different, distributed computing environment. As illustrated in FIG. 3, the operating system 348 may include an application 335. In one embodiment, the application 335 is a middleware application that connects applications, processes, and/or software components. In the illustrated embodiment, the application 335 may consist of a set of enabling services that allow multiple processes running on one or more logical partitions of one or more computers to interact. As such, the application 335 may be a distributed application configured across multiple logical partitions (i.e., as shown in FIG. 3, across logical partitions 340) of one or more computers (i.e., as shown in FIG. 3, application is configured across computer 310) as part of a distributed computing environment. One such distributed computing environment is a WebSphere architecture, as developed by IBM, such that a business may set up, operate, and integrate network-based websites, applications, or businesses across one or more computing systems.

Each operating system 348 may execute in a separate memory space, represented by logical memories 331. For example and as discussed herein, each logical partition 340 may share the processors 311 by sharing a percentage of processor resources as well as a portion of the available memory 245 for use in the logical memory 331. In this manner, the resources of a given processor 311 may be utilized by more than one logical partition 340. In similar manners, the other resources available to computer 310 may be utilized by more than one logical partition 340.

The hypervisor 354 may include a dispatcher 358 that manages the dispatching of virtual resources to physical resources on a dispatch list, or a ready queue 359. The ready queue 359 comprises memory that includes a list of virtual resources having work that is waiting to be dispatched to a resource of computer 310. As shown in FIG. 3, the hypervisor 354 includes processors 311 and processor control blocks 360. The processor control blocks 360 may interface with the ready queue 359 and comprise memory that includes a list of virtual processors 313 waiting for access on a respective processor 311. Although FIG. 3 illustrates at least one processor control block 360 for each processor 311, one skilled in the art will appreciate that the hypervisor 354 may be configured with more or less processor control blocks 360 than there are processors 311.

The computer 310 may be configured with a virtual file system 361 to display a representation of the allocation of physical resources to the logical partitions 340. The virtual file system 361 may include a plurality of file entries associated with respective portion of physical resources of the computer 310 disposed in at least one directory associated with at least one logical partition 340. As such, the virtual file system 361 may display the file entries in the respective directories in a manner that corresponds to the allocation of resources to the logical partitions 340. Moreover, the virtual file system 361 may include at least one virtual file entry associated with a respective virtual resource of at least one logical partition 340.

Advantageously, a user may interface with the virtual file system 361 to adjust the allocation of resources to the logical partitions 340 of the computer 310 by adjusting the allocation of the file entries among the directories of the virtual file system 361. As such, the computer 310 may include a configuration manager (CM) 362, such as a hardware management console, in communication with the virtual file system 361 and responsive to the interaction with the virtual file system 361 to allocate the physical resources of the computer 310. The configuration manager 362 may translate file system operations performed on the virtual file system 361 into partition management commands operable to be executed by the hypervisor 354 to adjust the allocation of resources of the computer 310.

Additional resources, e.g., mass storage, backup storage, user input, network connections, and the like, are typically allocated to the logical partitions 340 in a manner well known in the art. Resources may be allocated in a number of manners, e.g., on a bus-by-bus basis, or on a resource-by-resource basis, with multiple logical partitions 340 sharing resources on the same bus. Some resources may also be allocated to multiple logical partitions at a time. FIG. 3 illustrates, for example, three logical buses 365, 366, 367. The bus 365 is illustrated with a plurality of resources, including a DASD 368, a control panel 370, a tape drive 372, and an optical disk drive 374. All the resources may be allocated on a shared basis among logical partitions 340. Bus 366, on the other hand, may have resources allocated on a resource-by-resource basis, e.g., with a local area network (LAN) adapter 376, an optical disk drive 378, and a DASD 380 allocated to the logical partition 340, as to LAN and wide area network (WAN) adapters 382 and 384 allocated to the logical partition 342. The LAN and WAN adapters 382 and 384 interface with network devices of connected networks. The bus 367 may represent, for example, a bus allocated specifically to logical partition 344, such that all resources on the bus, e.g., DASDs 386, 388 are allocated to the same logical partition.

Figure 4:
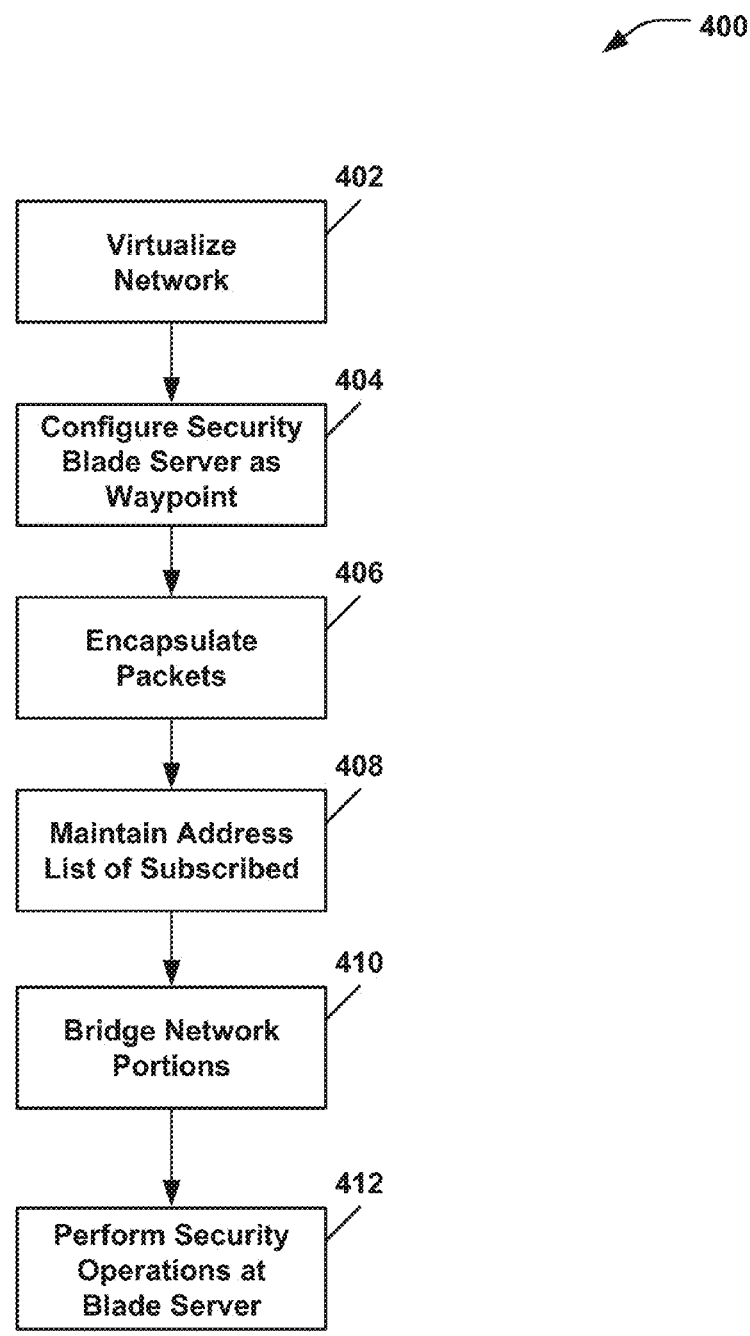
FIG. 4 is a flowchart of an embodiment of a method of automatically and dynamically using a security blade server to create secure communication channels for network devices.

FIG. 4 is a flowchart of an embodiment of a method 400 of using a dedicated security blade server to perform security operations on network traffic. The method 400 may be executed by an apparatus, such as the systems of FIGS. 1-3. Turning more particularly to the flowchart, network devices may be virtualized by an SDE at 402. For example, the network controller 104 of FIG. 1 may use the API 112 to create an address list 116 of virtualized devices.

At 404, the security blade server may be configured as a waypoint between network devices. A central secure server may virtually position the secure network channel between the plurality of network devices without reconfiguring at least one of a router and switch. A single API may be used to concurrently configure the security blade server and another security blade server. For instance, the network controller 104 of FIG. 1 may use the API 112 to virtually and selectively position the security blade server 102 as waypoint for the network traffic.

A data packet at 406 may be encapsulated with an address associated with the security blade server 102, and an address list of subscribed network devices associated with the security operation may be maintained at 408.

A first portion of a network may be bridged together at 410 to separate a second portion of the network. As such, portions of the network that are secured by the security blade server may be bridged together. The bridged portions may further be separated, or walled off, from other portions that are not secured. In this manner, an embodiment functions similar to a DNS, in that different virtual machines may be mapped into different virtual networks.

A security operation may be performed at the security blade server at 412. The security operation may include at least one of a trusted computing metric, an IPsec protocol, a validation operation, and a cryptographic protocol. Performing the security operation at the security blade server may relieve workload burdens on switching and routing recourse, among other advantages explained above.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A system comprising:
a security blade server configured to perform a security operation on network traffic exchanged between network devices in a first portion of a virtual network that includes the security blade server and network devices outside the first portion in a second portion of the virtual network, the network devices in the first portion bridged together and secured by the security blade server, wherein the first portion of the virtual network is protected by the security operation of the security blade server, wherein the network devices are bridged together by the security blade server to separate the second portion of the virtual network from the first portion of the virtual network, and wherein a gateway bridges the first portion and the second portion; and
a network controller configured to execute an application and concurrently program, using an application program interface (API), the security blade server and another security blade server to perform the security operation, to encrypt and encapsulate data, to access an address list, to virtualize each of the network devices in the virtual network based on a software defined environment, and to virtually position the security blade server as a bridge in a channel of the network traffic exchanged between at least two of the network devices using the API.

2. The system of claim 1, further comprising a memory accessible to the network controller and that includes the API.

3. The system of claim 1, wherein the network controller is further configured to initiate calls to one or more APIs operative in each of the network devices to virtualize each of the network devices to create the virtual network.

4. The system of claim 1, wherein the security operation includes at least one of establishing a trusted computing connection during a performance of a login authentication, an Internet Protocol Security (IPsec) operation, a validation operation, or a cryptographic operation.

5. The system of claim 1, wherein the security blade server is dedicated to performing the security operation.

6. The system of claim 1, wherein the network controller is further configured to create a set of virtual local area networks (VLANs) and to assign each of the network devices to a common VLAN of the set of VLANs.

7. The system of claim 1, further comprising an application profile executable by the network controller, wherein a content of the application profile is usable to concurrently program the security operation of a plurality of subscribing security blade servers that includes the security blade server.

8. The system of claim 1, wherein the second portion of the virtual network is unprotected by the security operation of the security blade server.

9. The system of claim 1, wherein the address list is configured to map a first virtualized network device to a first virtual network and a second virtualized network device to a second virtual network.

10. The system of claim 1, wherein the address list includes a virtual layer-2 address and a virtual layer-3 address of each of the virtualized network devices.

11. The system of claim 1, wherein the network controller is further configured to serve as an entry point to the virtual network, and wherein the security blade server is further configured to encrypt data at the entry point.

12. The system of claim 1, wherein the security blade server is further configured to encrypt and encapsulate data originating from the network devices connected to the virtual network.

13. A system comprising:
a memory including executable program code;
a processor coupled to the memory, wherein the executable program code, when executed by the processor at a security blade server, causes the processor to:
perform a security operation on network traffic exchanged between network devices in a first portion of a virtualized network and network devices outside the first portion in a second portion of the virtualized network, wherein the memory is included in one of the network devices, wherein the first portion of the virtual network is protected by the security operation of the security blade server, wherein the network devices are bridged together by the security blade server to separate the second portion of the virtual network from the first portion of the virtual network, wherein the network devices in the first portion are bridged together and secured by the processor, and wherein a gateway bridges the first portion and the second portion; and
perform authentication with a host and a network device, the processor configured to receive a data packet that is encapsulated, based on the authentication, with a header configured to direct traffic in the virtualized network; and
a controller configured to access an address list, to virtualize each of the network devices in the virtualized network based on a software defined environment, and to virtually position the processor as a bridge for network traffic between at least two of the network devices using an application program interface (API).

14. The system of claim 13, wherein the address list is configured to map a first virtualized network device to a first virtual network and a second virtualized network device to a second virtual network.

15. The system of claim 13, wherein the address list includes a virtual layer-2 address and a virtual layer-3 address of each of the virtualized network devices.

16. The system of claim 13, wherein the controller is further configured to serve as an entry point to the virtualized network, and wherein the processor is further configured to encrypt data at the entry point.

17. The system of claim 13, wherein the processor is further configured to encrypt and encapsulate data originating from the network devices connected to the virtualized network.

18. The system of claim 13, wherein the controller is further configured to initiate calls to one or more APIs operative in the network devices to virtualize each of the network devices to create the virtualized network.

19. The system of claim 13, wherein the security operation includes at least one of establishing a trusted computing connection during a performance of a login authentication, an Internet Protocol Security (IPsec) operation, a validation operation, or a cryptographic operation.

20. The system of claim 13, wherein the security blade server is dedicated to performing the security operation.

* * * * *